US005330566A

United States Patent [19]

Copeland

[11] Patent Number: 5,330,566
[45] Date of Patent: Jul. 19, 1994

[54] CAPSULE COATING

[75] Inventor: Claude T. Copeland, Appleton, Wis.
[73] Assignee: Appleton Papers Inc., Appleton, Wis.

[21] Appl. No.: 840,422
[22] Filed: Feb. 24, 1992
[51] Int. Cl.[5] .......... C09D 11/00
[52] U.S. Cl. .......... 106/21 E; 106/21 R
[58] Field of Search .......... 106/21 R, 21 C, 21 E; 428/402.2

[56] References Cited

U.S. PATENT DOCUMENTS

| | | | |
|---|---|---|---|
| 3,900,669 | 8/1975 | Kiritani | 106/21 E |
| 4,335,013 | 6/1982 | Allart et al. | 106/21 R |
| 4,343,652 | 8/1982 | Allart et al. | 106/21 R |
| 4,348,234 | 9/1982 | Cespon | 106/21 C |
| 4,398,954 | 8/1983 | Stolfo | 106/21 C |
| 4,552,811 | 11/1985 | Brown et al. | 428/402.21 |
| 4,596,996 | 6/1986 | Sandberg et al. | 346/207 |
| 4,640,714 | 2/1987 | Kagota et al. | 106/21 C |
| 4,729,792 | 3/1988 | Seitz | 106/21 C |
| 4,745,097 | 5/1988 | Maekawa et al. | 503/209 |
| 4,822,769 | 4/1989 | Langlais et al. | 106/21 C |
| 5,024,699 | 6/1991 | Llyama et al. | 106/21 R |
| 5,030,281 | 7/1991 | Miller et al. | 106/21 R |
| 5,064,470 | 11/1991 | Scarpelli | 106/21 C |

*Primary Examiner*—Helene Klemanski
*Attorney, Agent, or Firm*—Benjamin Mieliulis

[57] ABSTRACT

The present invention discloses an improved coating for pressure-sensitive record material of the type comprising an aqueous slurry of binder and anionic microcapsules containing a color former and a solvent. The improvement comprises including in addition in the aqueous slurry an aluminum cation as a cationic metal salt in a concentration range of from about 0.15 parts of cation per 100 parts microcapsules to about 3.9 parts of cation per 100 parts microcapsules on a dry weight basis. Enhanced image intensity based on the active weight of coating used as measured by capsule solids is observed.

1 Claim, 1 Drawing Sheet

CAPSULE COATING

FIELD OF THE INVENTION

1. Background of the Invention

This invention relates to coatings useful for manufacture of pressure-sensitive record materials, more particularly microcapsule slurries useful as coatings for manufacture of carbonless papers.

Pressure-sensitive carbonless copy paper of the transfer type consists of multiple cooperating superimposed plies in the form of sheets of paper which has coated, on one surface of one such ply, microcapsules containing a solution of one or more color formers (hereinafter referred to as a CB sheet) for transfer to a second ply carrying a coating comprising one or more color developers (hereinafter referred to as a CF sheet). To the uncoated side of the CF sheet can also be applied pressure-rupturable microcapsules containing a solution of color formers resulting in a pressure-sensitive sheet which is coated on both the front and back sides (hereinafter referred to as a CFB sheet). When said plies are superimposed, one on the other, in such manner that the microcapsules of one ply are in proximity with the color developers of the second ply, the application of pressure, as by typewriter, sufficient to rupture the microcapsules, releases the solution of color former (also called chromogenic material) and transfers color former solution to the CF sheet resulting in image formation through reaction of the color former solution with the color developer. Such transfer systems and their preparation are disclosed in U.S. Pat. No. 2,730,456.

Methods of microcapsule manufacture are disclosed in U.S. Pat. Nos. 4,001,140; 4,087,376; 4,089,802; 4,100,103; 4,100,103; 4,221,710; 4,552,811 incorporated herein by reference.

2. Description of Related Art

A CB sheet traditionally consists of a substrate or base sheet coated with a color former layer consisting of a mixture of pressure-rupturable microcapsules, protective stilt material such as uncooked starch particles and one or more binder materials. The color formers, compared to the other components of the color former layer, are extremely costly and, therefore, maximizing the utilization of these color formers in the production of images is a continuing objective of pressure-sensitive carbonless copy paper manufacturers.

Various methods to more efficiently utilize the color former solution of the CB sheet have been disclosed. U.S. Pat No. 3,565,666 discloses the use of a subcoating of latex material to assist in the transfer of capsule-yielded liquid from the ruptured capsules to the CF sheet during the application of imaging printing pressures.

U.S. Pat. No. 4,745,097 teaches use of a subbing layer comprised of a flocculant including cationic polymers or anionic polymers, emulsions, and charged fine particles, for aggregating microcapsules to prevent permeation of microcapsules into the base paper.

The above methods, however, have shortcomings. Use of U.S. Pat. No. 4,745,097's subbing layer involves an additional manufacturing step and requires relatively large amounts of flocculant that add to overall coating weight making the process not favored commercially. Avoiding use of a subbing layer while achieving enhancements from flocculant use would be an advance in the art. Flocculant addition to the capsule slurry is not favored in the art for theological considerations primarily because of the problem of premature gelling, flow inhibition, agglomeration, and undesired viscosity increase. Overcoming such problems and eliminating requirements for a subbing layer would be an advance in the art.

DESCRIPTION OF THE INVENTION

Figure 1:
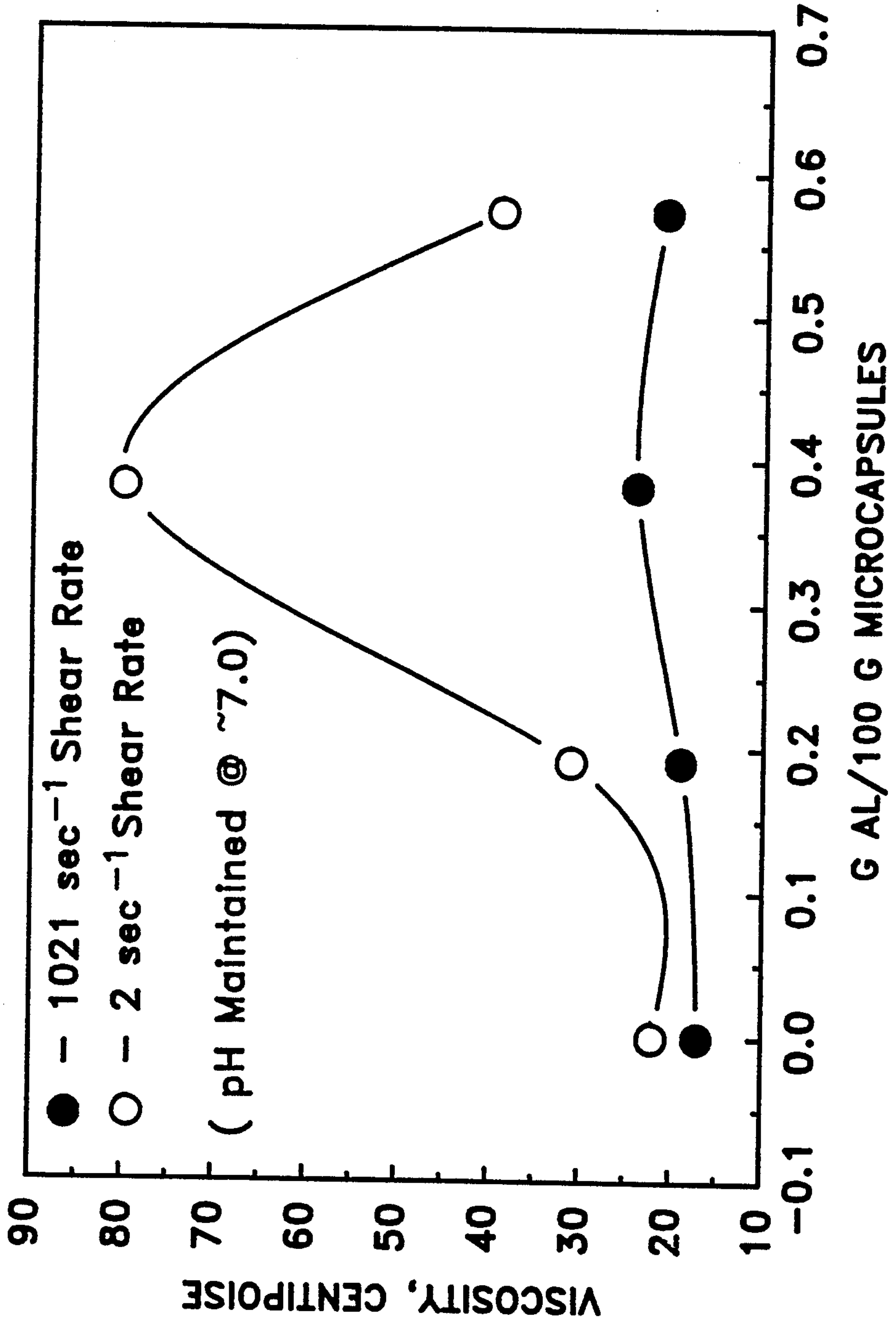
FIG. 1 is a graph of viscosity at high and low shear rates graphed versus grams of aluminum cation as polyaluminum chloride per 100 grams of microcapsules on a dry weight basis.

The present invention comprises an improved coating for pressure-sensitive record material of the type comprising an aqueous slurry of binder and anionic microcapsules containing a color former and a solvent wherein the improvement comprises including in addition in the aqueous slurry an aluminum cation as a cationic metal salt in a concentration range of from about 0.15 parts of cation per 100 parts microcapsules to about 3.9 parts of cation per 100 parts microcapsules on a dry weight basis.

The addition of an aluminum cation as a cationic metal salt to a color-forming layer for pressure-sensitive record material comprised of binder and anionic microcapsules in a concentration range of from 0.15 parts of cation per 100 parts microcapsules to about 3.9 parts of cation per 100 parts microcapsules on a dry weight basis enables formation of CB and CFB sheets which provide improved image intensity based on the active weight of the coating as measured by capsule solids. Useful salts include aluminum chloride, polyaluminum chloride, and aluminum chlorohydrate. Polyaluminum chloride is preferred.

Addition to the color-forming layer of aluminum cation as an aluminum salt surprisingly was found to yield a more efficient CB sheet. A more efficient CB sheet enables minimizing the amount of color former needed for the formation of a satisfactory image.

A CB sheet is generally formed by coating a substrate or base sheet with a color former coating consisting typically of pressure-rupturable microcapsules containing a solution of color formers, and one or more binder materials. Typically, protective stilt material such as uncooked wheat starch particles are also included. A CFB sheet is formed in a similar manner with an exception being that the other side of the sheet is coated with a layer of color developer. When the coated side of a CB sheet (color former layer) is placed in contact with the color developing layer of the CF coated sheet and pressure is applied, as for example with a typewriter, a fraction of the color forming capsules is ruptured and a fraction of the color former solution released transfers to the CF sheet where a reaction with a color developer results in formation of an image. Typically, using single oil drop, negatively charged color former capsules such as described, for example, in U.S. Pat. Nos. 4,552,811; 4,001,140; and 4,100,103 only a fraction of the total available color former present in the anionic microcapsules per unit area is transferred. The majority of available color former in the anionic microcapsules in fact does not transfer. The amount transferred appears determined by the fraction of color former capsules present which are ruptured and by the efficiency of the transfer of the released color former solution to the CF sheet. The fraction of the color former capsules ruptured is generally believed to be partially controlled by the relative location of the binder and the color former capsules. The color formers are the most expensive component of the color former layer of CB's and CFB's. Minimizing the amount of color former needed for the formation of a satisfactory image is commercially advantageous.

Anionic capsules are typically highly dispersed. Such capsules differ from gelatin capsules which typically agglomerate more extensively. Historically, gelatin capsules demonstrate enhanced image intensity based on the active weight of the coating as measured by capsule solids; however, such capsules have other drawbacks making anionic capsules attractive if such can be applied with enhanced image intensity based on comparable active weights.

In the present invention, sufficient cationic aluminum salt is added to induce particle-particle interaction involving the negatively charged microcapsules containing colorformers. These interactions are believed to make the negatively charged microcapsules or single oil drop microcapsules behave more like aggregated gelatin capsules.

Criticality, in the addition of aluminum salt to the aqueous slurry of microcapsules is found, in that, surprisingly, the effect is not observed with addition below 0.15 parts microcapsules and above 3.9 parts per 100 parts microcapsules, on a dry weight basis, undesirable viscosity increase and undesirable rheology characteristics predominate. pH of the slurry is maintained at greater than about 6.

Particle-particle interaction during the dewatering process as the color former layer is deposited is believed to favor positioning the color former capsules and binder in the color former layer formed so as to increase the amount of capsule with color former ("color former capsules") ruptured when image forming pressure is applied which in turn increases the amount of color former solution transferred to the CF sheet from a given concentration of color former capsules per unit area. The concentration of color former capsules per unit area is commonly referred to as the active weight of coat or AWOC. This improved transfer allows either the formation of a satisfactory image with application of less AWOC or the formation of an image with enhanced intensity applying equal AWOC compared to results obtained with conventional CB coatings.

The liquid core material or solvent for the color former employed in the microcapsules can be any material which is liquid within the temperature range at which carbonless copy paper is normally used and which does not suppress or otherwise adversely affect the color-forming reaction. Examples of eligible liquids include, but are not limited to, those solvents conventionally used for carbonless copy paper, including ethyldiphenylmethane (U.S. Pat. No. 3,996,405); benzylxylene (U.S. Pat. No. 4,130,299 ); alkyl biphenyls such as propylbiphenyl (U.S. Pat. No. 3,627,5810 and butylbiphenyl (U.S. Pat. No. 4,287,074); dialkyl phthalates in which the alkyl groups thereof have from 4 to 13 carbon atoms, e.g. dibutyl phthalate, dioctylphthalate, dinonyl phthalate and ditridecylphthalate; 2,2,4-trimethyl-1,3-pentanediol diisobutyrate (U.S. Pat. No. 4,027,065); $C_{10}$–$C_{14}$ alkyl benzenes such as dodecyl benzene; alkyl or aralkyl benzoates such as benzyl benzoate; alkylated naphthalenes such as dipropylnaphthalene (U.S. Pat. No. 3,806,463); partially hydrogenated terphenyls; high-boiling straight or branched chain hydrocarbons; and mixtures of the above. The solvents for the color former can include any of the above which possess sufficient solubility for the color former.

Microcapsules which are anionic can be prepared by processes well known in the art such as from urea-formaldehyde resin and/or melamine-formaldehyde resin as disclosed in U.S. Pat. Nos. 4,001,140; 4,100,103; or 4,552,811.

This invention can be demonstrated with any size of microcapsule normally used for CB coating.

The CB sheet of the present invention can be utilized for image formation with any CF sheet which contains one or more developer materials for the color former material employed in the CB sheet.

When the color former employed in the CB sheet of the present invention is a basic chromogenic material, then any known acidic developer material may be employed in the CF sheet, such as, for example, clays; treated clays (U.S. Pat. Nos. 3,622,364 and 3,753,761); aromatic carboxylic acids such as salicylic acid; derivatives of aromatic carboxylic acids and metal salts thereof (U.S. Pat. No. 4,022,936); phenolic developers (U.S. Pat. No. 3,244,550); acidic polymeric material such as phenol-formaldehyde polymers, etc. (U.S. Pat. Nos 3,455,721 and 3,672,935); and metal-modified phenolic resins (U.S. Pat.. Nos. 3,732,120; 3,737,410; 4,165,102; 4,165,103; 4,166,644 and 4,188,456).

The color formers useful in the microcapsules used in the invention are electron donating dye precursors, also known as chromogenic material. These are colorless or light colored materials which upon contact with acidic developer material form a colored mark.

Examples of color formers for use in the microcapsules of the present invention include, but are not limited to, Crystal Violet Lactone [3,3-bis(4-dimethylaminophenyl)-6-dimethylaminophthalide (U.S. Pat. No. Re. 23,024)]; phenyl-, indol-, pyrrol-, and carbazol-substituted phthalides (for example, in U.S. Pat Nos. 3,491,111; 3,491,112; 3,491,116; 3,509,174); nitro-; amino-, amido-, sulfon amido-, aminobenzylidene-, halo-, anilino-substituted fluorans (for example, in U.S. Pat. Nos. 3,624,107; 3,627,787; 3,641,011; 3,642,828; 3,681,390); spirodipyrans (U.S. Pat. No. 3,971,808); and pyridine and pyrazine compounds (for example, in U.S. Pat. Nos. 3,775,424 and 3,853,869 ). Other examples of useful chromogenic materials are: 3-diethylamino-6-methyl-7-anilinofluoran (U.S. Pat. No. 3,681,390); 7-(1-ethyl-2-methylindol-3-yl)-7-(4-diethylamino-2-ethoxyphenyl)-5,7-dihydrofuro[3,4-b]pyridin-5-one (U.S. Pat. No. 4,246,318); 3-diethylamino-7-(2-chloroanilino)fluoran (U.S. Pat. No. 3,920,510); 3-(N-methylcyclohexylamino)-6-methyl-7-anilinofluoran (U.S. Pat. No. 3,959,571); 7-(1-octyl-2-methylindol-3-yl) -7-(4-diethylamino-2-ethoxyphenyl)-5,7-dihydrofuro[3,4-b]pyridin-5-one; 3-diethylamino-7,8-benzofluoran; 3,3-bis(1-ethyl-2-methylindol-3-yl)phthalide; 3-diethylamino-7-anilinofluoran; 3-diethylamino-7-benzylaminofluoran; 3'-phenyl-7-dibenzylamino-2,2'-spiro-di[2H-1-benzopyran]; and mixtures of any two or more of the above.

The preceding examples of color formers and developers are illustrative and are not to be considered as limiting.

Unless otherwise indicated herein, all measurements, percentages or parts are on the basis of weight and in the metric system.

EXAMPLE 1

In a series of experiments, commercial grade color forming anionic capsules as described in U.S. Pat. No. 4,552,811 with slightly varying compositions and hereafter referred to as anionic capsules were mixed with uncooked wheat starch particles, water and either corn starch binder and/or experimental agent. These coating formulations were applied to base paper by means of an air knife coating station and the resultant coatings were dried by means of hot air. In each experiment, a control coating formulation containing only color former capsules, uncooked wheat starch particles, corn starch binder solution, and water was coated as a control or reference coating.

The resultant CB or CFB sheets were tested to accurately determine the AWOC using a specific colorimetric method of analysis. The resultant CB sheets were also coupled with a CF sheet coated with a zinc-modified phenolic resin and imaged in a Typewriter Intensity (TI) test. Results of the TI test were measured in Kubelka-Munk (K-M) units which expresses print intensity in terms of the quantity of color present in each image. Use of the K-M unit as a means of determining the quantity of color present is discussed in TAPPI, Paper Trade J., pages 13-38, Dec. 21, 1939. Table I summarizes the results. Addition of polyvalent polyaluminum chloride (PAC PLUS supplied by Gulco Inc.) was observed to provide enhancement of the KM/AWOC ratio.

TABLE I

EXPERIMENTAL RESULTS COATING BASE PAPER

| TEST NO. | COATING DESCRIPTION | COATING FORMULATION, DRY PARTS: COLOR FORMER CAPSULES | WHEAT STARCH | CORN STARCH BINDER | EXPERIMENTAL ADDITIVE (1D) (PARTS) | |
|---|---|---|---|---|---|---|
| A-1 | Control CB | 100 | 22 | 10 | | none |
| A-2 | Exper. CB | 100 | 22 | 10 | a | 2.6 |

| TEST NO. | AWOC (lb/rm) | 24 HR TI (I/Io) | 24 HR TI (K.M. Units) | RATIO (KM/AWOC) | SPOT TEST RESULTS |
|---|---|---|---|---|---|
| A-1 | 2.6 | 53.7 | 0.200 | 0.077 | NEG |
| A-2 | 2.3 | 52.8 | 0.211 | 0.092 | POS |

a = polyaluminum chloride

EXAMPLE 2

Experimental and control CB coatings were applied and tested as in Example 1 with the exception that the coatings were applied as a second layer over subcoats which had previously been applied to the basestock. Subcoat I was a capsular subcoat of the type described in U.S. Pat. No. 4,596,996.

The addition of polyaluminum chloride in experiments C-2 and C-3 was observed to provide a positive spot test result and when coated on base paper an enhancement of the image intensity/AWOC relationship as evidenced by the increased KM/AWOC ratio relative to the control experiment C-1.

TABLE IIA

AIR KNIFE COATER EXPERIMENTS

| TEST NO. | COATING DESCRIPTION | COATING FORMULATION, DRY PARTS: SUBCOAT | COLOR FORMER CAPSULES | WHEAT STARCH | CORN STARCH BINDER | EXPERIMENTAL ADDITIVE (PARTS) | |
|---|---|---|---|---|---|---|---|
| C-1 | Control CB | I | 100 | 22 | 10 | | none |
| C-2 | Exper. CB | I | 100 | 22 | 10 | a | 2.6 |
| C-3 | Exper. CB | I | 100 | 22 | 10 | a | 1.3 |

| TEST NO. | AWOC (lb/rm) | 24 HR INTENSITY (TI)* (K.M. Units) | RATIO (KM/AWOC) | SPOT TEST RESULTS |
|---|---|---|---|---|
| C-1 | 2.0 | 0.282 | 0.141 | NEG |
| C-2 | 2.0 | 0.317 | 0.158 | POS |
| C-3 | 1.8 | 0.282 | 0.156 | POS |

a = polyaluminum chloride
*Intensity (TI) determined on solid block image

EXAMPLE 3

A laboratory test herein referred to as the "Spot Test" was developed to aid in identifying those materials and dosages which would favorably structure the CB coating Using the anionic capsules of Example 1 for application on an air knife coater at 15 to 25% solids content. The spot test consists of placing 0.2 ml of the CB coating of interest on a sheet of Whatman 54 filter paper using a syringe. Interpretation of test results is based on the apparent colloidal stability of the coating formulation as it undergoes dewatering on the filter paper. If movement of liquid is detected around the spot formed by the drop of coating the test result is reported as positive. If no movement of fluid is detected, the result is reported as negative. For comparison, a control coating made with aggregated gelatin microcapsules yields very rapid dewatering with fluid movement around the drop while the anionic capsule-containing control coatings yield no dewatering or fluid movement around the drop indicating highly dispersed solids. The results of spot tests run on fully formulated CB coatings prepared in the laboratory @15 to 25% solids are given in Table III. Experience has taught that formulations yielding a positive spot test would provide image/AWOC enhancement. Those formulations observed to yield a positive spot test result in Table III would yield a favorable image intensity/AWOC relationship when used to make a CB or CFB sheet. In Table III, the upper limits appear regulated by solids of the coating and theology.

TABLE III

SPOT TESTS WITH FULLY FORMULATED PAC CB COATINGS @ 15 TO 25% SOLIDS

| TEST NO | COATING FORMULATION (DRY PARTS) | ADDITIVE X | SPOT TEST |
|---|---|---|---|
| III-1 | 100A/22B/10C/0.2X to 0.6X | Polyaluminum chloride (X = Al) | POS |
| III-2 | 100A/22B/10C/0.2X to 1.25X | Aluminum Chlorohydrate (X = Al) | POS |
| III-3 | 100A/22B/10C/.15X | Aluminum sulfate (X = Al) | POS |

A = Color former capsules
B = Wheat starch stilt
C = Corn starch binder
X = Experimental additive

EXAMPLE 4

One of the accepted means of verifying particle-particle interaction or amount of structuring in a coating is by measuring the theology of the coating. (See "The Structure of Paper Coatings, An Update" by P. Le Poutre—a 1989 TAPPI publication). In experiment series 4, a potential structure building agent was added incrementally to a CB coating of anionic capsules, and the viscosity was measured after each addition. FIG. 1 shows that the addition of a cationic metal salt to an aqueous slurry of binder and microcapsules containing color former and solvent affects viscosity in a nonlinear manner. The low shear test was with a Brookfield LVF, using a No. 1 spindle. FIG. 1 demonstrates that the viscosity increase under shear showed much less increase than comparatively at low shear.

EXAMPLE 5

Experimental and control CB coatings were applied as in Example 1. The resultant CB sheets were tested for AWOC and TI as described in Example 1. Additionally, the resultant CB sheets were tested for static smudge by coupling the CB sheet with a CF sheet as described in Example 1 and applying a pressure of 550 psi. The resultant image is measured ten minutes later and according to the following formula:

$$\text{Static Smudge} = \frac{\text{Imaged Area Reflectance} \times 100}{\text{Background Reflectance}}$$

The purpose of this test is to determine the tendency of the CB to be damaged during handling. Table IV summarizes the results. Addition of carboxymethyl cellulose (CMC) and PALC was observed to improve smudge resistance over that obtained with a reference or reference coating containing polyaluminum chloride but no CMC. It is further important to note that the less intense the image formed in the static smudge test, the more resistant is the CB to damage during handling.

TABLE VA

| TEST NO. | COATING DESCRIPTION | COLOR FORMER CAPSULES | WHEAT STARCH | CORN STARCH BINDER | POLYALUMINUM CHLORIDE | CMC |
|---|---|---|---|---|---|---|
| 1 | Control | 100 | 22 | 10 | 0 | 0 |
| 2 | Control + PALC | 100 | 22 | 10 | 2.6 | 4 |
| 3 | Control + PALC + CMC | 100 | 22 | 10 | 2.6 | 0 |

TABLE VB

| TEST NO. | COATING DESCRIPTION | AWOC (lb/rm) | 24 HR TI (I/Io) | 24 HR TI (K.M. Units) | RATIO (K.M./AWOC) | (I/Io) STATIC SMUDGE @ 550 psi |
|---|---|---|---|---|---|---|
| 1 | Control | 2.2 | 49.9 | .252 | .114 | 82 |
| 2 | Control + PALC | 2.3 | 47.4 | .292 | .127 | 74 |
| 3 | Control + PALC + CMC | 2.1 | 48.5 | .273 | .130 | 83 |

PALC = polyaluminum chloride
CMC = carboxymethyl cellulose

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive variations, and changes can be made by those skilled in the art without departing from the spirit and scope of the invention.

What is claimed is:

1. An improved coating for pressure-sensitive record material of the type comprising an aqueous slurry at a pH greater than 6 of binder and anionic microcapsules containing a color former and a solvent wherein the improvement comprises including in addition in the aqueous slurry an aluminum cation as a cationic metal salt selected from the group consisting of polyaluminum chloride, aluminum chloride, aluminum chlorohydrate and aluminum sulphate in a concentration range of from about 0.15 parts of cation per 100 parts microcapsules to about 3.9 parts of cation per 100 parts microcapsules on a dry-weight basis.

* * * * *